(12) United States Patent
Ichikawa et al.

(10) Patent No.: US 10,846,741 B2
(45) Date of Patent: Nov. 24, 2020

(54) ADVERTISEMENT CREATING DEVICE AND COMPUTER-READABLE RECORDING MEDIUM

(71) Applicant: CASIO COMPUTER CO., LTD., Tokyo (JP)

(72) Inventors: Tatsuzi Ichikawa, Kawagoe (JP); Keita Anjo, Tokyo (JP); Kazuyasu Yamane, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 311 days.

(21) Appl. No.: 15/885,200

(22) Filed: Jan. 31, 2018

(65) Prior Publication Data
US 2018/0260842 A1 Sep. 13, 2018

(30) Foreign Application Priority Data

Mar. 8, 2017 (JP) .................................. 2017-043850

(51) Int. Cl.
*G06Q 30/02* (2012.01)
*G06F 3/0482* (2013.01)
(Continued)

(52) U.S. Cl.
CPC ....... *G06Q 30/0251* (2013.01); *G06F 3/0482* (2013.01); *G06F 3/1423* (2013.01); *G06F 3/0488* (2013.01)

(58) Field of Classification Search
USPC .......................... 705/7.36; 345/173; 455/418
See application file for complete search history.

(56) References Cited

U.S. PATENT DOCUMENTS

| 2005/0012723 | A1* | 1/2005 | Pallakoff | G06F 1/1616 345/173 |
| 2008/0040175 | A1* | 2/2008 | Dellovo | G06Q 10/0637 705/7.36 |
| 2010/0222046 | A1* | 9/2010 | Cumming | G06Q 30/02 455/418 |

FOREIGN PATENT DOCUMENTS

| JP | 06187411 A | 7/1994 |
| JP | 2002117320 A | 4/2002 |

(Continued)

OTHER PUBLICATIONS

Japanese Office Action dated Nov. 26, 2019 (and English translation thereof) issued in Japanese Patent Application No. 2017-043850.

*Primary Examiner* — Afaf Osman Bilal Ahmed
(74) *Attorney, Agent, or Firm* — Holtz, Holtz & Volek PC (57) ABSTRACT

An advertisement creating device includes a display controller for displaying an advertisement on a display screen as a display sample. A selector selects a display candidate to be displayed in response to a switching operation received by a receiver as a post-switching display sample from a plurality of display candidates in accordance with a predetermined priority order determined using a two-dimensional array. The two-dimensional array has a first plurality of display candidates having different display styles for a first display mode in a first axis direction and a second plurality of display candidates having different display styles for a second display mode in a second axis direction. The selector selects an adjacent candidate image in the first axis direction or the second axis direction in the array as a display sample to be displayed after switching, and the receiver receives the switching operation that enables such selection.

9 Claims, 7 Drawing Sheets

(51) Int. Cl.
  *G06F 3/14* (2006.01)
  *G06F 3/0488* (2013.01)

(56) References Cited

FOREIGN PATENT DOCUMENTS

| | | | |
|---|---|---|---|
| JP | 2013196488 A | 9/2013 | |
| JP | 2013218717 A | 10/2013 | |
| JP | 2015198335 A | 11/2015 | |

\* cited by examiner

ADVERTISEMENT CREATING DEVICE AND COMPUTER-READABLE RECORDING MEDIUM

CROSS-REFERENCE TO RELATED APPLICATIONS

This application is based upon and claims the benefit of priority from the prior Japanese Patent Application No. 2017-043850, filed on Mar. 8, 2017, the entire contents of which are incorporated herein by reference.

BACKGROUND OF THE INVENTION

1. Field of the Invention

The present invention relates to an advertisement creating devices and a computer-readable recording medium.

2. Description of the Related Art

Advertisement creating devices that create advertisements such as point of purchase (POP) advertisements have been developed to enhance sales promotion. An example of such advertisement creating devices is a POP creating system that creates a POP showing the name and price of a commodity based on the number of its stocks. (Refer to, for example, Japanese Unexamined Patent Application Publication No. 2013-196488)

SUMMARY OF THE INVENTION

According to one aspect of the present invention, there is provided an advertisement creating device, including:

a display controller for displaying an advertisement on a display screen as a display sample, the advertisement including a plurality of display components;

a receiver for receiving a switching operation for replacement of the display sample on the display screen; and a selector for selecting a display candidate to be displayed in response to the switching operation received by the receiver as a post-switching display sample from a plurality of display candidates in accordance with a priority order of display predetermined for each display candidate, wherein the priority order of display is determined using a two-dimensional array, such that the two-dimensional array has a first plurality of display candidates having different display styles for a first display mode in a first axis direction and a second plurality of display candidates having different display styles for a second display mode in a second axis direction, and the selector selects a candidate image in the first axis direction or the second axis direction, the candidate image being adjacent to the display candidate corresponding to a pre-switching sample, as a display sample to be displayed after switching, and the receiver receives the switching operation that enables such selection.

According to another aspect of the present invention, there is provided an advertisement creating device for creating an advertisement to promote sales of a target commodity or service, including:

a selector for selecting a display component of the advertisement based on specific information entered by a user, the specific information specifying the target commodity or service;

a creating unit for acquiring the display component selected by the selector and for combining the acquired display component with the specific information to create a display candidate; and a display controller for displaying the display candidate created by the creating unit on the display screen, wherein the display controller displays a display candidate having a different display style of a first display component contained in the display candidate on the display screen in response to a first switching operation entered by the user and displays a display candidate having a different display style of a second display component contained in the display candidate on the display screen in response to a second switching operation entered by the user.

According to another aspect of the present invention, there is provided a computer-readable permanent recording medium storing a program instructing a computer to perform the following processes including:

a display controlling process for displaying an advertisement on a display screen as a display sample, the advertisement containing a plurality of display components;

a receiving process for receiving a switching operation for replacement of the display sample on the display screen; and a selecting process for selecting a display candidate to be displayed in response to a switching operation received by the receiving process as a post-switching display sample from a plurality of display candidates in accordance with a priority order of display predetermined for each display candidate, wherein the priority order of display is determined using a two-dimensional array, such that the two-dimensional array has a first plurality of display candidates having different display styles for the first display mode in a first axis direction and a second plurality of display candidates having different display styles for the second display mode in a second axis direction, and the selecting process selects a candidate image in the first axis direction or the second axis direction, the candidate image being adjacent to the display candidate corresponding to a pre-switching sample, as a display sample to be displayed after switching, and the receiving process receives the switching operation that enables such selection.

DETAILED DESCRIPTION OF THE PREFERRED EMBODIMENTS

Embodiments according to the present invention will now be described with reference to the accompanying drawings.

Although the embodiments described below have various preferred technical restrictions to implement the present invention, these embodiments and drawings, however, should not be construed to limit the scope of the invention.

<Configuration of Advertisement Creating System 1>

Figure 1:
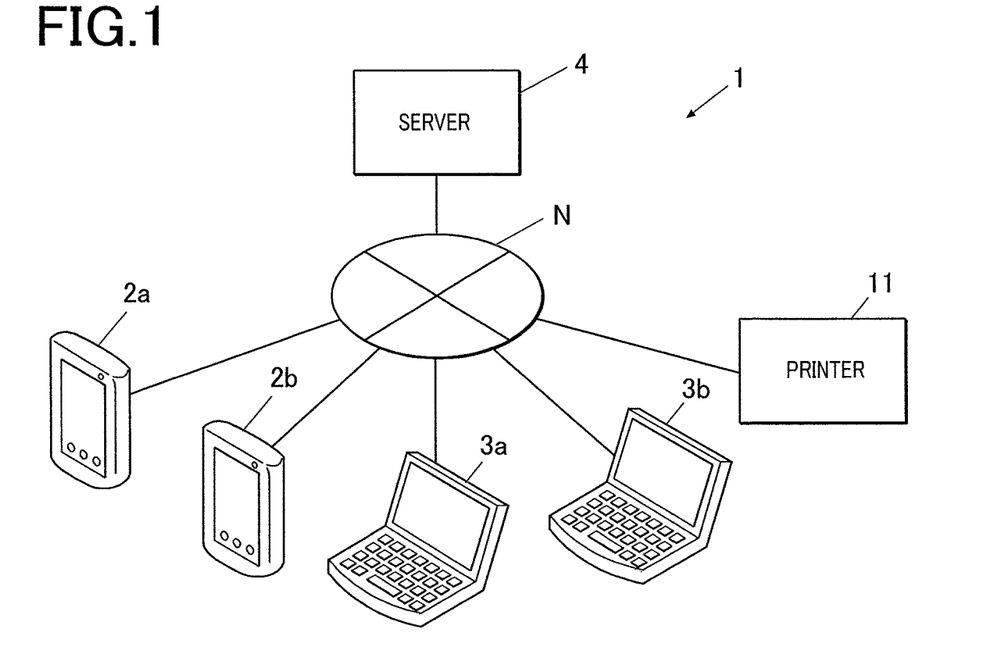
FIG. 1 is a schematic diagram illustrating the configuration of an advertisement creating system according to the embodiment of the present invention.

A configuration according to the embodiment of the present invention will be described with reference to FIG. 1. FIG. 1 is a schematic diagram illustrating the configuration of an advertisement creating system 1 according to the embodiment of the present invention.

The advertisement creating system 1 according to the embodiment of the present invention creates POP data to be used as an advertisement based on input information. The advertisement creating system 1 can switch the display style for a POP data component (or a display component) of a POP candidate image (or a display candidate) in accordance with a user operation.

With reference to FIG. 1, the advertisement creating system 1 includes a server (advertisement creating device) 4, mobile terminals 2a and 2b, such as smart phones or tablets, personal computers (PCs) 3a and 3b, and a printer 11. These devices are mutually connected via a communication network N. The mobile terminals 2a and 2b and PCs 3a and 3b may be collectively referred to as "user terminals". It should be noted that the user terminals connected to the server 4 should not be limited to the mobile terminals 2a and 2b and the PCs 3a and 3b. Any number of user terminals may be connected to the server 4, depending on the number of users receiving services from the server 4. The user terminals may be point of sales (POS) terminals connected to the server 4.

The server 4 creates POP data being an advertisement for sales promotion and manages the created POP data. In response to a request from a user terminal, the server 4 sends an input screen 5 (see FIG. 5) that allows a user to enter information necessary to create POP data, a preview screen 6 (see FIG. 7) of the created POP candidate image, or an edit screen 7 (See FIG. 9) that allows the user to switch the display style for a POP data component of a POP candidate image to the user terminal.

The user terminals, such as the mobile terminal 2a or 2b, receive and display various types of information sent from the server 4 and send operational information entered through user's operation to the server 4.

A printer 11 is an electrophotographic or inkjet printer for home or business use and prints POP data etc. on a sheet in accordance with entered print instructions.

The communication network N is the Internet and may further include local area networks (LANs), wide area networks (WANs), telephone lines, dedicated lines, mobile communication networks, satellite communications networks, and cable television (CATV) lines.

The advertisement creating system 1 may execute other application programs on user terminals. Such application programs perform, for example, sales management tasks, such as aggregation and analysis of daily or monthly sales of stores; accounting management tasks, such as payment of taxes (fixed asset tax or individual enterprise tax); payroll management tasks, such as calculation of employee payroll; employment management tasks, such as shift management of store staff and employee attendance management; and document management tasks, such as creation and management of notices sent to interested operators and employees. The advertisement creating system 1 can execute these application programs and thus can function as a business support system.

<Configuration of the Server 4>

Figure 2:
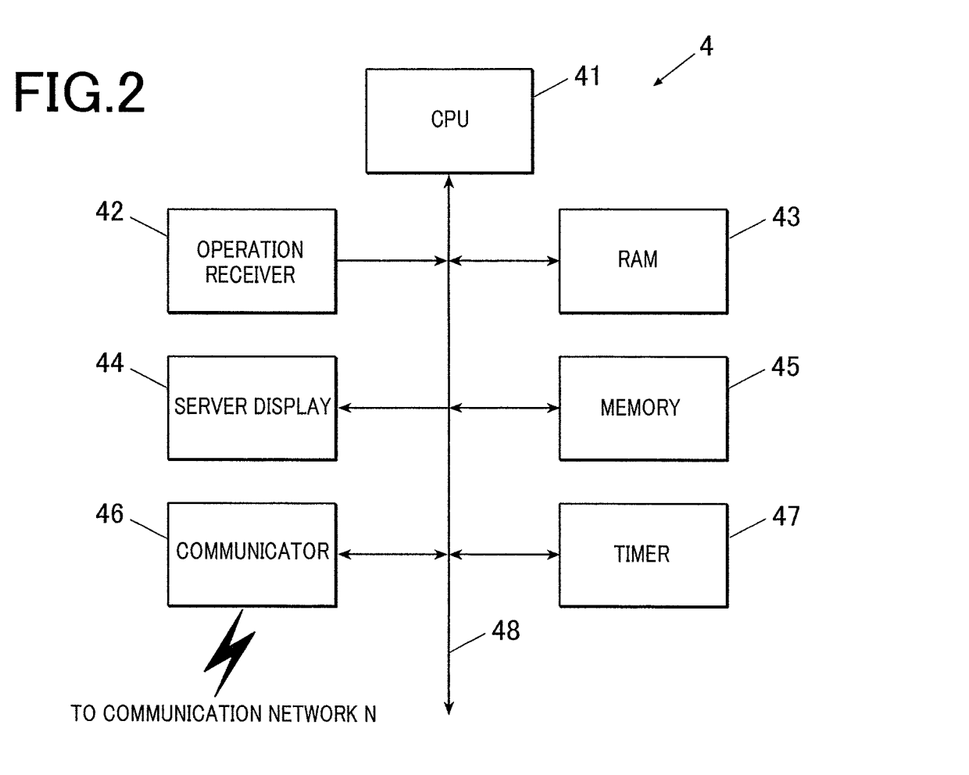
FIG. 2 is a block diagram illustrating a functional configuration of a server.

An internal configuration of the server 4 will now be described. FIG. 2 illustrates the internal configuration of the server 4.

As shown in FIG. 2, the server 4 includes a central processing unit (CPU) 41, an operation receiver 42, a random access memory (RAM) 43, a server display 44, a memory 45, a communicator 46, and a timer 47, which are mutually connected via a bus 48.

The CPU 41 reads OS programs stored in the memory 45 into a work area in the RAM 43 and controls various units according to the OS programs. The CPU 41 also reads processing programs stored in the memory 45 into the work area and performs various processes on the server 4, such as a POP data creating process and a POP candidate data editing process (described below). The CPU 41 thus functions as a selector, a creating unit, a display controller, and a setting unit.

The operation receiver 42 includes a keyboard having cursor keys, alphanumeric keys, and various functional keys. In response to a key pressed by the user, the operation receiver 42 sends operational information to the CPU 41. Alternatively, the operation receiver 42 may include a pointing device, such as mouse and send a positional input to the CPU 41 as operational information.

The RAM 43 is a volatile memory and includes a work area for storing various programs to be executed and data relevant to these programs.

The server display 44 may be a liquid crystal display (LCD) or a cathode ray tube (CRT) and controls the screen in response to display control signals from the CPU 41.

The memory 45 may be a hard disk drive (HDD) having a magnetic recording medium. The memory 45 contains OS programs and application programs to be executed by the CPU 41 and data necessary for executing these programs. The application programs include processing programs and web server programs. The processing programs include programs that execute various processes on the server 4, such as the POP data creating process and POP candidate data editing process (described below).

These programs are stored in the memory 45 in the form of computer-readable program codes. The CPU 41 sequentially executes operations in accordance with these programs codes.

Figure 5:
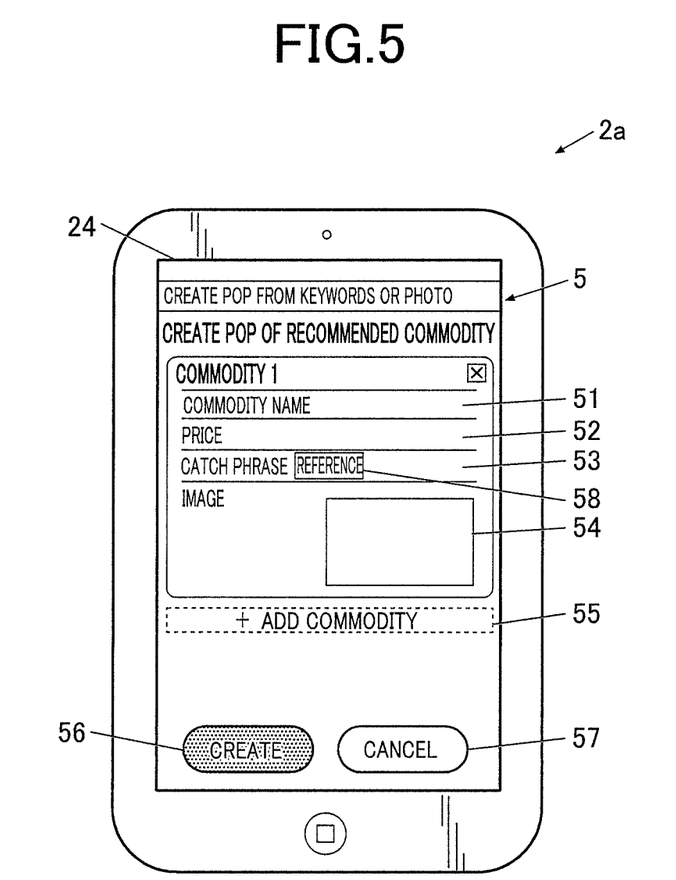
FIG. 5 illustrates an exemplary input screen before entry of information.

The memory 45 preliminarily contains various types of data used to perform the POP data creating process. In other words, the memory 45 contains POP data components, such as layouts, eye catches, fonts, backgrounds, font colors, textures, and illustrations. These POP data components are classified into different categories. The memory 45 also contains user information, for example, the industry sector and business category of the store or company the user runs or works at. The POP data components stored on the memory 45 are each associated with words and color combinations derived from the information entered through the input screen 5, such as commodity name, catch phrase and image data, with the industry sector and business category in the user information, and with a season or event identified by the timer 47.

The memory 45 stores various types of data entered by the user during the POP data creating process or the POP candidate data editing process. In other words, the memory 45 retains creation history of, for example, image data entered on the input screen 5 and POP data created in the past.

The communicator 46 includes a modem, a terminal adapter (TA), a router, and a network card. The communicator 46, which is connected to external devices on the communication network N, such as user terminals, sends and receives data.

The timer 47 includes an internal clock circuit. The timer 47 keeps date and time and outputs the current time information.

<Configuration of Mobile Terminal 2a>

Figure 3:
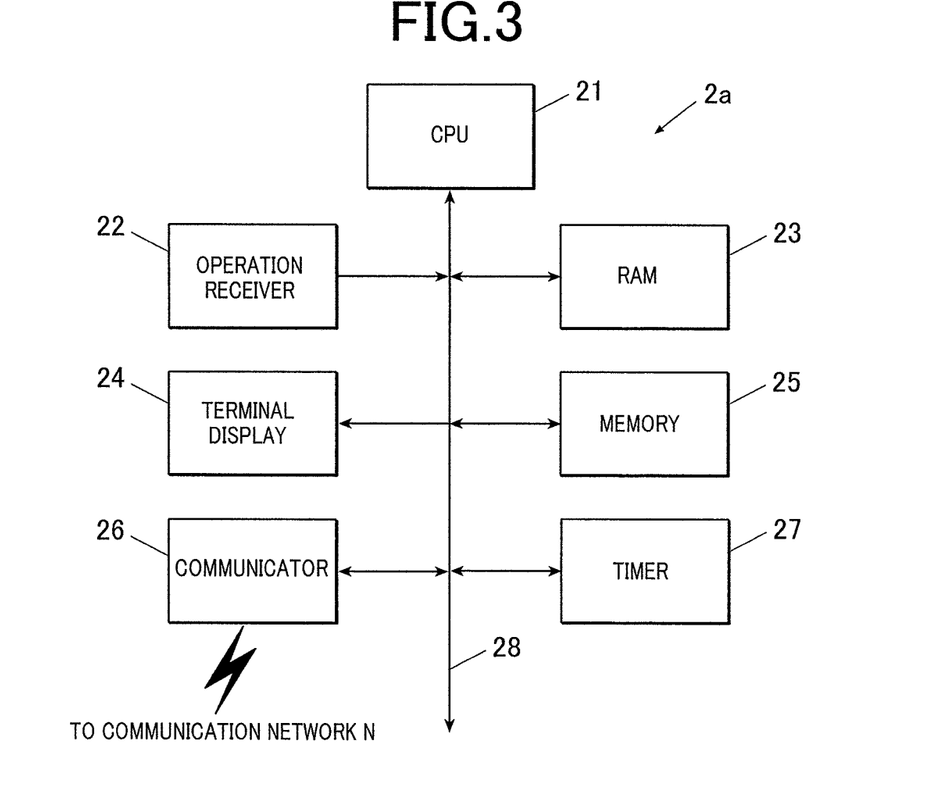
FIG. 3 is a block diagram illustrating a functional configuration of a mobile terminal.

An internal configuration of a mobile terminal 2a will now be described as an example of the user terminal. FIG. 3 illustrates an internal configuration of the mobile terminal 2a.

As shown in FIG. 3, the mobile terminal 2a includes a CPU 21, an operation receiver 22, a RAM 23, a terminal display (display screen) 24, a memory 25, a communicator 26, and a timer 27, which are mutually connected via the bus 28.

The mobile terminal 2b, the PC 3a, and PC 3b have a substantially similar configuration.

The CPU 21, the operation receiver 22, the RAM 23, the terminal display 24, the memory 25, the communicator 26, and the timer 27 have configurations substantially identical to those of the CPU 41, the operation receiver 42, the RAM 43, the server display 44, the memory 45, the communicator 46, and the timer 47 of the server 4, respectively. The following description focuses on differences.

The CPU 21 reads OS programs stored in the memory 25 into a work area of the RAM 23 and controls various units according to the OS programs. The CPU 21 also reads processing programs stored in the memory 25 into the work area and performs various processes on the mobile terminal 2a, such as the POP data creating process and the POP candidate data editing process (described below).

The operation receiver 22 includes push button switches and a touch sensor provided on the terminal display 24. The operation receiver 22 receives user input operations, converts the operations into an electrical signal, and outputs the electrical signal to the CPU 21.

The terminal display 24 includes a LCD and a CRT. The terminal display 24 displays information on a screen in response to a display control signal from the CPU 21. The terminal display 24, which is provided with the touch sensor, functions as a means for operating the touch panel and displaying information on the touch panel.

The memory 25 includes a hard disk drive (HDD) having a magnetic recording medium. The memory 25 contains OS programs and application programs to be executed by the CPU 21 and data necessary for executing these programs. The application programs include processing programs and web server programs. The processing programs include programs that execute various processes on the mobile terminal 2a, such as the POP data creating process and the POP candidate data editing process (described below).

The communicator 26 communicates with external devices on the communication network N, such as the server 4.

<Operation of the Server 4>

Figure 4:
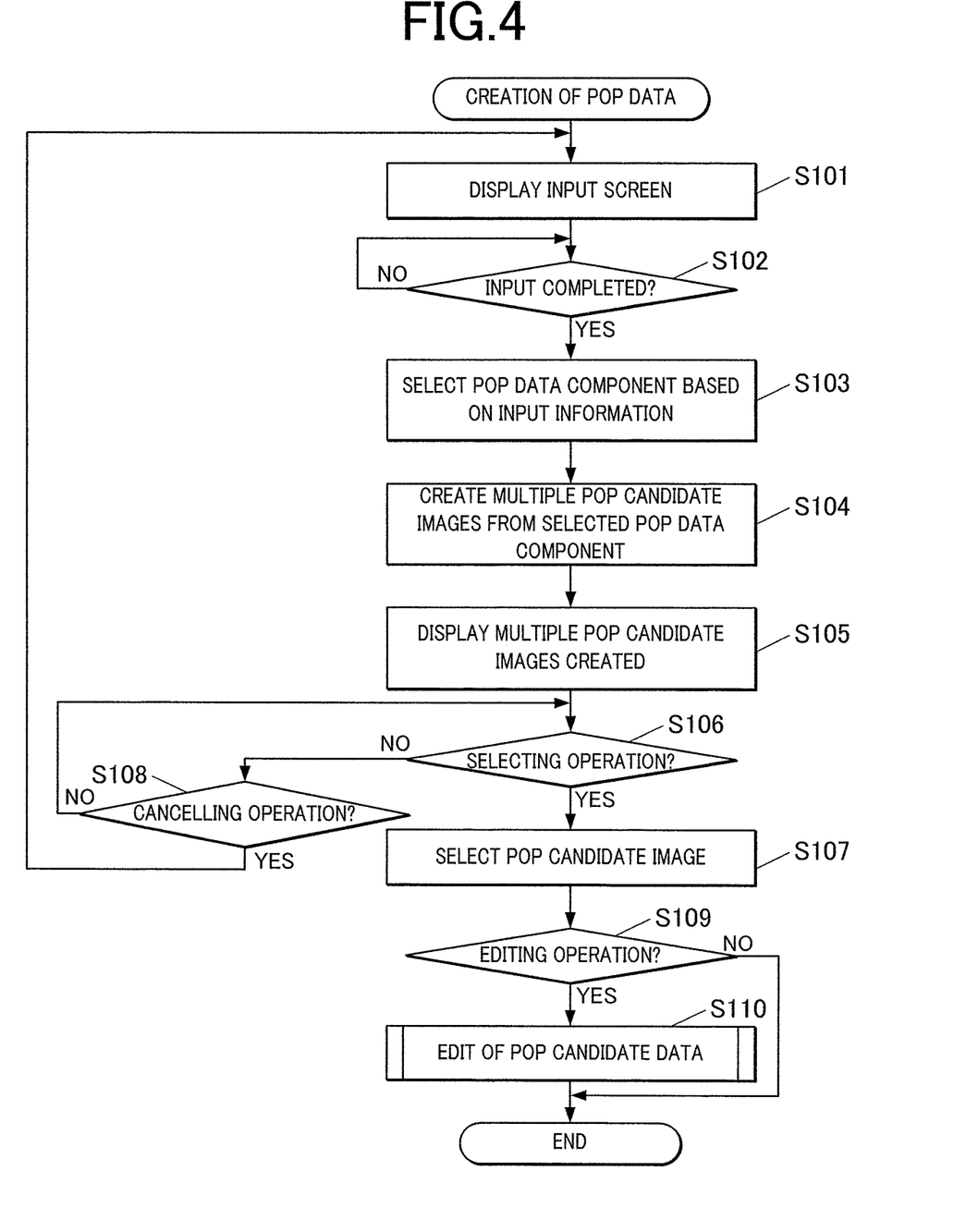
FIG. 4 is a flow chart illustrating an exemplary POP data creating process by the server.
Figure 6:
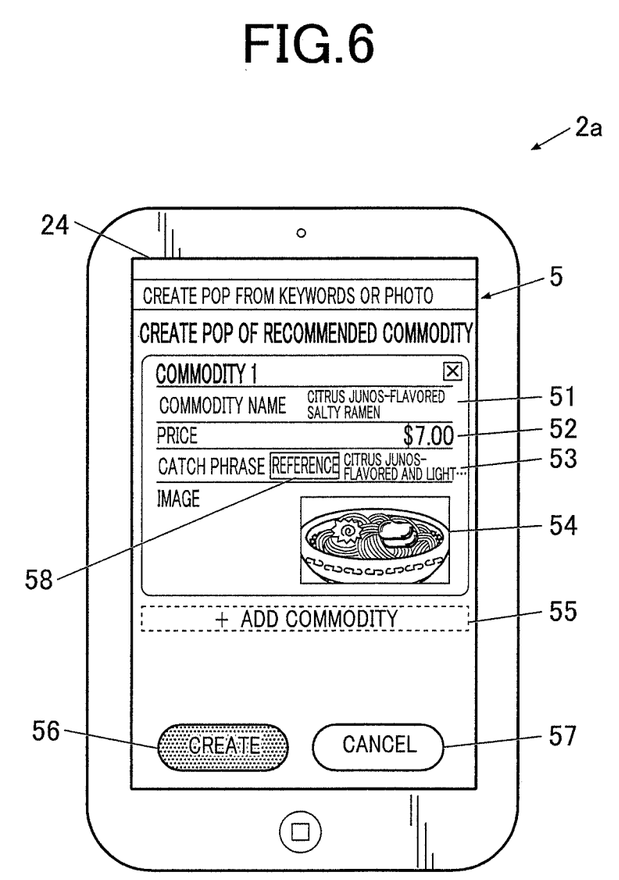
FIG. 6 illustrates an exemplary input screen after entry of information.
Figure 7:
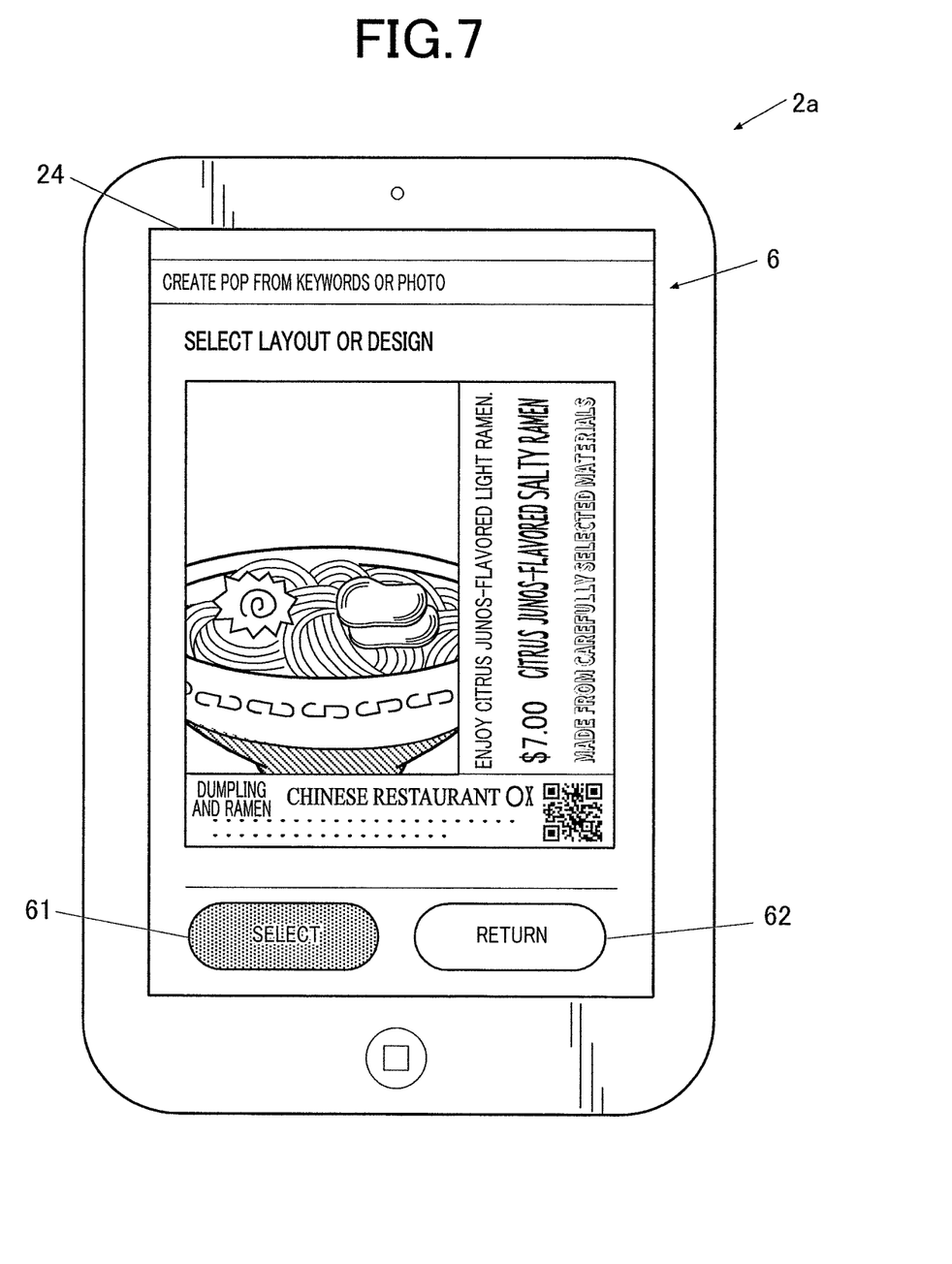
FIG. 7 illustrates an exemplary preview screen.

With reference to FIGS. 4 to 7, the POP data creating process performed by the server 4 according to the embodiment of the present invention will now be described. FIG. 4 is a flowchart illustrating an exemplary POP data creating process. FIG. 5 illustrates the input screen 5 displayed on the terminal display 24 before entry of information. FIG. 6 illustrates the input screen 5 displayed on the terminal display 24 after entry of information. FIG. 7 illustrates an exemplary preview screen 6 displayed on the terminal display 24.

The server 4 performs the POP data creating process based on a text and image data entered by the user through the user terminal to create POP data that introduces a target commodity or service.

With reference to FIG. 4, the CPU 41 of the server 4 displays the input screen 5 shown in FIG. 5 on the terminal display 24 in response to a request from the user terminal to execute a POP data creating program (Step S101). The input screen 5 is used to enter information necessary to create POP data. The necessary information includes the name, price, catch phrase, and image data of the target commodity to be introduced using POP data created. At least one of the name and image data of the target commodity constitutes specific information of the target commodity according to the embodiment of the present invention. The input screen 5 has a commodity name input field 51, a price input field 52, a catch phrase input field 53, and an image data input field 54. These input fields are used to enter the above information. Besides the input fields 51 to 54, the input screen 5 has an "Add Commodity" button 55, a "Create" button 56, a "Cancel" button 57, and a "Reference" button 58. The "Add Commodity" button 55 is selected by the user to add a commodity to be introduced to POP data. The "Create" button 56 is selected by the user to create POP data after entering information. The "Cancel" button 57 is selected by the user to exit the input screen 5. The "Reference" button 58 is selected by the user to display reference information when catch phrases are entered (for example, catch phrase samples and trendy words).

Selecting the "Add Commodity" button 55 on the input screen 5 by the user adds one commodity name input field 51, one price input field 52, one catch phrase input field 53, and one image data input field 54 to the input screen 5. Selecting the "Add Commodity" button 55 one more time newly adds the input fields 51 to 54 and then entering information in these newly added fields allows the CPU 41 to create POP data that introduces two commodities. Likewise, repeating the selection of the "Add Commodity" button 55 and the entry of information in newly added input fields 51 to 54 allows the CPU 41 to create POP data that introduces the multiple commodities.

The input fields 51 to 54 on the input screen 5 should be filled with specific information of a single commodity, i.e., at least one of the commodity name and image data for the target commodity. Since an increased amount of information entered enhances the accuracy of POP data to be created, all the input fields 51 to 54 should be preferably filled with information.

With reference to FIG. 4, the CPU 41 determines whether input has been completed (Step S102). In detail, the CPU 41 determines the input to have been completed if the user selects, for example, the "Create" button 56 after entering a commodity name in the commodity name input field 51 or image data in the image data input field 54.

If it is determined that the input has not been completed (Step S102: NO), the CPU 41 resumes Step S102; otherwise (Step S102: YES), the CPU 41 selects POP data components in accordance with the information entered in the commodity name input field 51, the catch phrase input field 53, and the image data input field 54 (Step S103).

In detail, the CPU 41 selects POP data components suitable for the commodity name, the catch phrase, and the image data that have been entered, such as a layout, a font color, a font, a background, a texture, an illustration, and an eye catch, from the memory 45.

If the commodity name input field 51 or the catch phrase input field 53 is filled with a commodity name or a catch phrase in the form of text, the CPU 41 performs morphological analysis on the input text to extract words from the text. The CPU 41 then selects POP data components associated with the extracted words from the memory 45.

With reference to FIG. 6, the commodity name input field 51 is filled with "Citrus junos-flavored salty ramen". The CPU 41 performs morphological analysis to extract words of "citrus junos", "salt", and "ramen". The CPU 41 selects POP data components associated with the word of "citrus junos", for example, a font color of yellow or green, an illustration of citrus junos, and a layout associated with the word of "ramen" and suitable for introducing ramen.

If the image data input field 54 is filled with image data of the commodity, the CPU 41 performs image analysis on the input image data and identifies, for example, color combinations constituting the image data and the commodity name (a word) indicated by the image data. The CPU 41 then selects POP data components associated with the color combinations and the word derived from the image analysis from the memory 45.

As shown in FIG. 6, if the image data input field 54 is filled with image data of ramen, the CPU 41 performs image analysis on the image data to identify the color combinations in the image data and the word of "ramen" which is the name of the commodity illustrated by the image data. The CPU 41 then selects POP data components, such as the font color and background associated with the identified color combinations and a layout associated with the word of "ramen" and suitable for introducing ramen.

The CPU 41 may select POP data components based not only on the information entered on the input screen 5 but also on the user information stored in the memory 45, such as the memorized industry sector and business category of the user and the current season or event identified by the timer 47. In detail, if the industry sector and business category of the user is, for example, a Chinese restaurant, the CPU 41 selects POP data components associated with the industry sector and business category of the Chinese restaurant, such as a font color of red and a red-based background. If the season or event identified by the timer 47 is, for example, spring or summer, the CPU 41 selects POP data components associated with the identified season or event, such as a warm font color. If the season or event identified by the timer 47 is, for example, Christmas, the CPU 41 selects POP data components associated with the season or event, such an illustration of Christmas.

The CPU 41 receives POP data components selected at Step S103 from the memory 45 and combines the selected POP data components with the information entered on the input screen 5 into multiple POP candidate images (Step S104). If the number of the selected POP data components is greater than the number of POP candidate images to be created, a necessary number of POP data components may be randomly selected from the selected POP data components.

The CPU 41 displays the multiple POP candidate images that have been created on the terminal display 24 (Step S105). In detail, the CPU 41 displays the preview screen 6 showing one of the created multiple POP candidate images on the terminal display 24, as shown in FIG. 7. Although the POP candidate image displayed on the terminal display 24 may be any of the multiple POP candidate images that have been created at Step S104, a POP candidate image containing a large number of POP data components that are used frequently, as is evident from the creation history of POP data, is preferred. This facilitates finding of a POP candidate image of user's choice.

In the preview screen 6, the CPU 41 sequentially displays other POP candidate images that have been created at Step S104 in response to user's predetermined operations.

With reference to FIG. 4, the CPU 41 determines whether the user has selected a preferred POP candidate image (Step S106). In detail, if the user selects the "Select" button 61 while a preferred POP candidate image is displayed on the terminal display 24, the CPU 41 determines that the POP candidate image has been selected.

If it is determined that the selecting operation has not been performed (Step S106: NO), the CPU 41 determines whether the user has performed a cancelling operation to exit the preview screen 6 (Step S108). In detail, the CPU 41 determines that a cancelling operation has been entered when the user presses the "Cancel" button 62.

If it is determined that the cancelling operation is entered (Step S108: YES), the CPU 41 exits the preview screen 6 and resumes Step S101; otherwise (Step S108: NO), the CPU 41 resumes Step S106.

If it is determined that the selecting operation is entered (Step S106: YES), the CPU 41 selects one from the multiple POP candidate images that have been created at Step S104 based on the selecting operation (Step S107).

The CPU 41 then determines whether the user has performed an editing operation to edit a POP candidate image (Step S109).

If it is determined that the editing operations is entered (Step S109: YES), the CPU 41 performs the POP candidate data editing process to change the display style for a POP data component of the POP candidate image that has been selected at Step S107 (Step S110). The POP candidate data editing process will be explained below.

If it is determined that the editing operation has not been performed (Step S109: NO), the CPU 41 skips Step S109.

The POP data creating process is entered as described above.

After the completion of the POP data creating process, the CPU 41 stores the created POP candidate image in the memory 45 as complete POP data. In response to a request of print of the complete POP data by the user terminal, the CPU 41 outputs the POP data to the printer 11 via the communicator 46 to print it at the printer 11.

The CPU 41 creates multiple POP candidate images at Step S104 and selects a POP candidate image based on user's selecting operation at Step S107. Alternatively, the CPU 41 may create a single POP candidate image at Step S104 and does not perform Steps S106 or S107, i.e., does not select a POP candidate image.

Figure 8:
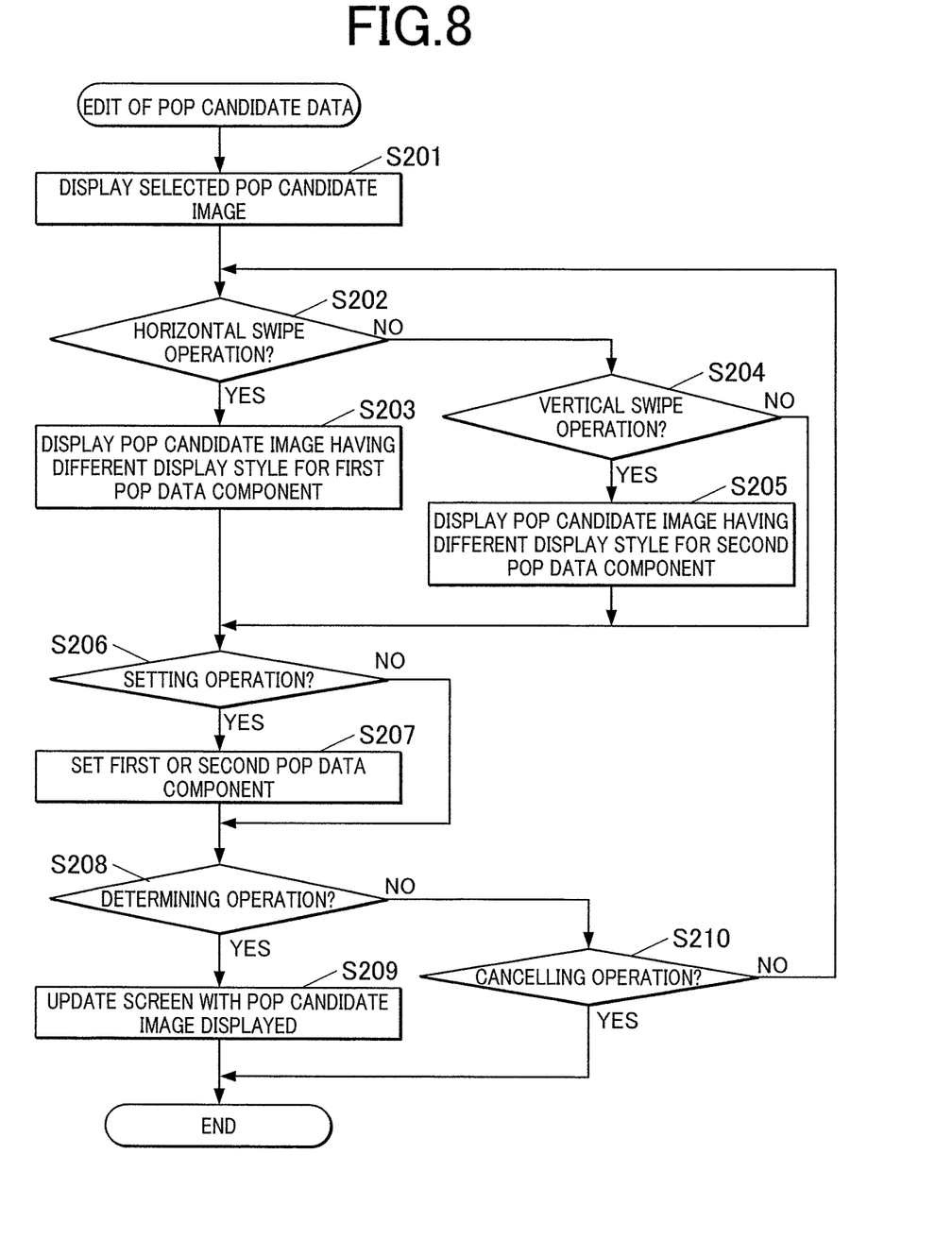
FIG. 8 is a flow chart illustrating an exemplary POP candidate data editing process of the server.
Figure 9:
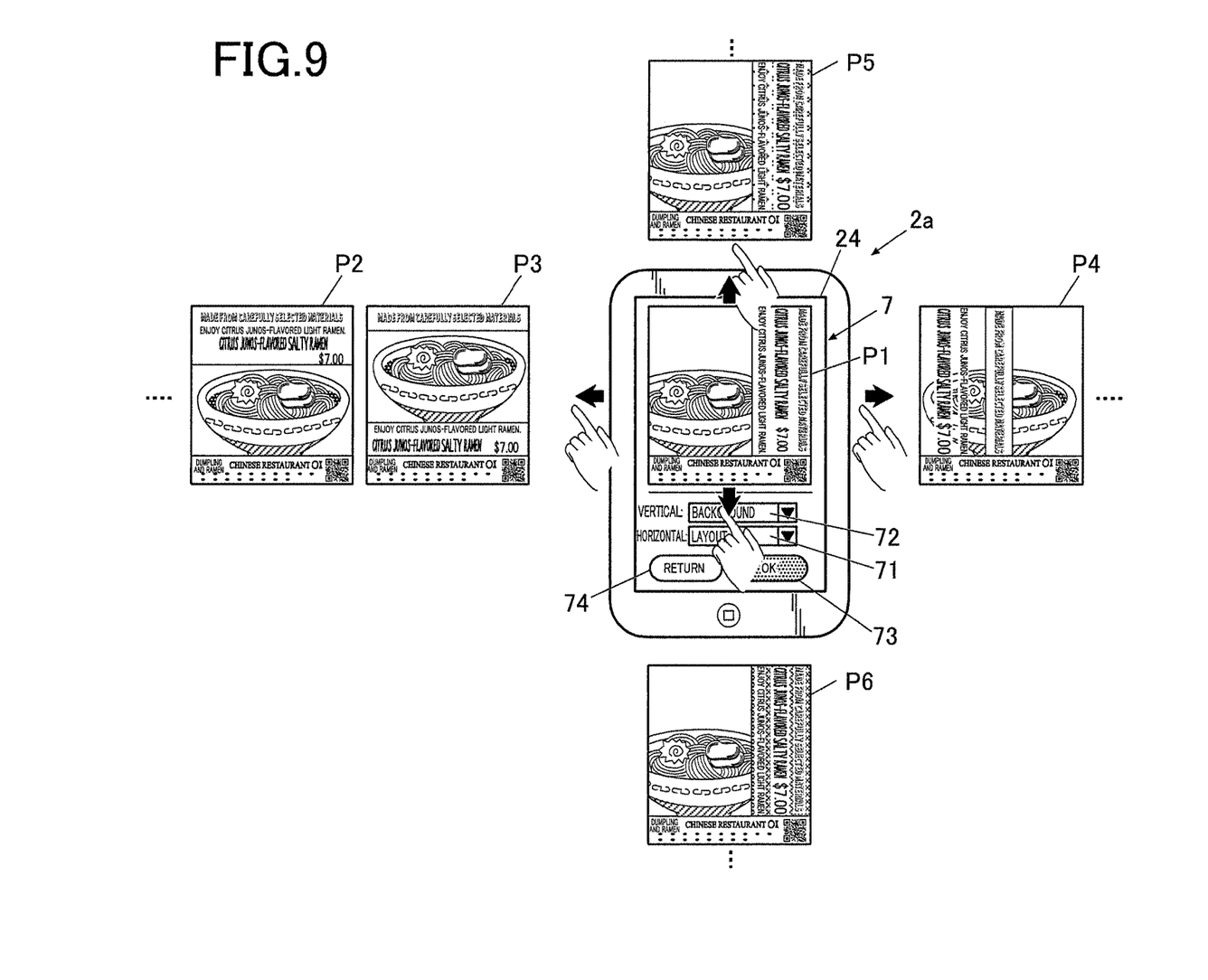
FIG. 9 illustrates exemplary POP candidate images displayed in the POP candidate data editing process.

The POP candidate data editing process performed by the server 4 according to the embodiment of the present invention will now be explained with reference to FIGS. 8 and 9. FIG. 8 is a flow chart illustrating an exemplary POP candidate data editing process. FIG. 9 illustrates exemplary POP images to be replaced in response to user's operation.

In the POP candidate data editing process, the CPU 41 receives a first switching operation or a second switching operation to switch a display sample to be displayed on the terminal display 24. Depending on the received switching operation, the CPU 41 selects a POP candidate image to be displayed as a post-switching display sample from the multiple POP candidate images in accordance with the order of display predetermined for each POP candidate image. More specifically, the order of display is determined using a two-dimensional array. The two-dimensional array has multiple POP candidate images, having different display styles, in a first axis direction representing a first display mode, i.e., a first POP data component or a first display component, and multiple POP candidate images, having different display styles, in a second axis direction representing a second display mode, i.e., a second POP data component or a second display component. The CPU 41 selects a candidate image adjacent to the POP candidate image corresponding to the pre-switching sample in the first axis direction or the second axis direction as a display sample to be displayed after switching. The CPU 41 displays the selected POP candidate image on the terminal display 24 as a post-switching display sample. The CPU 41 repeats these processes every time it receives the first or second switching operation entered by the user.

With reference to FIG. 8, the CPU 41 displays the edit screen 7 on the terminal display 24 (Step S201). The edit screen 7 displays the POP candidate image selected at Step S107 as a display sample. With reference to FIG. 9, the edit screen 7 includes setting buttons (dropdown lists) 71 and 72, an "OK" button 73, and a "Return" button 74. The setting buttons 71 and 72 are used to select the first POP data component and the second POP data component, respectively. The "OK" button 73 is used to accept a selected POP candidate image as a display sample displayed on the terminal display 24. The "Return" button 74 is used to exit the edit screen 7. The setting buttons 71 and 72 displays POP data components currently selected as the first and the second POP data components, respectively. In FIG. 9, the setting buttons 71 and 72 display "layout" and "background", respectively, which indicates that the first POP data component is "layout" and the second POP data component is "background".

The CPU 41 determines whether the user has performed a horizontal swipe operation on the terminal display 24 as the first switching operation (Step S202).

If it is determined that the horizontal swipe operation is entered (Step S202: YES), the CPU 41 displays a POP candidate image having a different display style for the first POP data component on the terminal display 24 as a display sample (Step S203). For example, if the first POP data component is set to "layout", the CPU 41 can display one of the POP candidate images P2 to P4 on the terminal display 24, where, the POP candidate images P2 to P4 differs only in display styles for the layout from the POP candidate image P1 displayed on the terminal display 24, as shown in FIG. 9. Repeated horizontal swipe operations allow the CPU 41 to display any of the POP candidate images P1 to P4 which differs only in display styles for the layout on the terminal display 24 as a display sample. This facilitates finding a POP candidate image of user's choice. Although FIG. 9 shows the POP candidate images P2 to P4 as exemplary POP candidate images which differs only in display styles for the layout, POP candidate images having other display styles for the layout may be further displayed.

If it is determined that no horizontal swipe operation is entered (Step S202: NO), the CPU 41 determines whether the user has performed a vertical swipe operation on the terminal display 24 as the second switching operation (Step S204).

If it is determined that a vertical swipe operation is entered (Step S204: YES), the CPU 41 displays a POP candidate image having a different display style for the second POP data component on the terminal display 24 as a display sample (Step S205). For example, if the second POP data component is set to "background", the CPU 41 displays one of POP candidate images P5 and P6 which differs only in display styles for the background from the POP candidate image P1 displayed on the terminal display 24, as shown in FIG. 9, on the terminal display 24. Repeated horizontal swipe operations allows the CPU 41 to display any of POP candidate images P1, P5, and P6 which differs only in display styles for the background on the terminal display 24 as a display sample. This facilitates finding a POP candidate image of user's choice. Although FIG. 9 shows POP candidate images P5 and P6 as exemplary POP candidate images which differs only in display styles for the background, POP candidate images having other display styles for the background may be further displayed.

If it is determined that no vertical swipe operation is entered (Step S204: NO), the CPU 41 skips Step S205.

The CPU 41 determines whether or not the setting operation has been performed by the user (Step S206). In detail, if the user selects, for example, the setting button 71 or 72 and sets it to a POP data component which is not currently displayed in the setting button 71 or 72, the CPU 41 determines the entry of the setting operation. The POP data components selectable in the setting button 71 or 72 are layout, eye catch, font, background, font color, texture, and illustration. A POP data component other than that has been already set as the first or second POP data component is selectable.

If it is determined that a setting operation is entered (Step S206: YES), the CPU 41 sets the first or second POP data component based on the setting operation performed by the user (Step S207). If the first POP data component is set to, for example, "font" with the setting button 71, the CPU 41 displays a POP candidate image which differs only in a display style for the font from the POP candidate image currently displayed on the terminal display 24 at Step S203 in response to a horizontal swipe operation by the user. If the second POP data component is set to, for example, "font color" with the setting button 72, the CPU 41 displays a POP candidate image which differs only in a display style for the font color from the POP candidate image currently displayed on the terminal display 24 at Step S205 in response to a vertical swipe operation by the user.

If it is determined that no setting operation is entered (Step S206: NO), the CPU 41 skips Step S207.

The CPU 41 determines whether or not the determining operation has been performed by the user (Step S208). In detail, if the user presses, for example, the OK button 73 on the edit screen 7, the CPU 41 determines that the determining operation has been performed.

If it is determined that no determining operation is entered (Step S208: NO), the CPU 41 determines whether or not the cancelling operation has been performed by the user (Step S210). In detail, if the user selects, for example, the "Return" button 74 on the edit screen 7, the CPU 41 determines that the cancelling operation has been performed.

If it is determined that the cancelling operation is entered (Step S210: YES), the CPU 41 exits the POP data creating process.

If it is determined that no cancelling operation is entered (Step S210: NO), the CPU 41 resumes Step S202. If the POP candidate image P2, for example, is displayed on the terminal display 24 after Step S203, the CPU 41 displays a POP candidate image (not shown) which differs only in the background from the POP candidate image P2 on the terminal display 24 at Step S205. If the POP candidate image P5, for example, is displayed on the terminal display 24 after Step S205, the CPU 41 displays a POP candidate image (not shown) which differs only in the background from the POP candidate image P5 on the terminal display 24 at Step S203.

If it is determined that a determining operation is entered (Step S208: YES), the CPU 41 accepts the POP candidate image selected at Step S107 as a POP candidate image displayed at the terminal display 24 (Step S209).

The POP candidate data is edited as described above.

<Technological Effects of the Embodiment of the Present Invention>

The server 4 according to the embodiment of the present invention includes the CPU 41. The CPU 41 displays a POP image, as a display sample, containing multiple POP data component on the terminal display 24, receives a switching operation for replacement of the display sample on the terminal display 24, and selects a POP candidate image as an updated display sample from the multiple POP candidate images in accordance with the priority order of display of the POP candidate images. More specifically, the priority order of display is determined using a two-dimensional array, such that the two-dimensional array has a first plurality of POP candidate images having different display styles for the first display mode in a first axis direction and a second plurality of POP candidate images having different display styles for the second display mode in a second axis direction. The CPU 41 selects a candidate image adjacent to the POP candidate image corresponding to the pre-switching sample in the first axis direction or the second axis direction as a sample to be displayed after switching, and receives a switching operation that enables such selection. This facilitates acquisition of POP data which meets user's preference.

The server 4 according to the embodiment of the present invention creates POP data to promote sales of a target commodity. The server 4 includes the CPU 41. The CPU 41 selects POP data components of the POP data based on specific information entered by a user that specifies a target commodity, acquires the selected POP data components, combines the acquired POP data components with the specific information to create a POP candidate image, and displays the created POP candidate image on the terminal display 24. In response to a first switching operation by the user, the CPU 41 displays a POP candidate having a different display style of first POP data component contained in the POP candidate images on the terminal display 24. In response to a second switching operation performed by the user, the CPU 41 displays a POP candidate having a different display style of second POP data component contained in the POP candidate images on the terminal display 24. This facilitates acquisition of POP data which meets user's preference.

The terminal display 24 is of a touch panel type for operation and display of information. A first switching operation is a swipe operation in the vertical or horizontal direction. A second switching operation is a swipe operation in the direction perpendicular to the direction of the first switching operation. The user can vary the display style for a POP data component of the POP candidate image through mere repeated swipe operations, which facilitates acquisition of POP data meeting user's preference.

The first POP data component and the second POP data component are each any of layout, eye catch, font, background, font color, texture, and illustration. The user can select POP data that contains the data components meeting user's preference.

Since the CPU 41 sets the first POP data component and the second POP data component in response to user's operation, the user can select pop data containing three or more varied POP data components meeting user's preference.

<Additional Description>

While the embodiment described above is a preferred exemplary embodiment of the advertisement creating device according to the present invention, the present invention should not be construed to limit to that embodiment.

In the embodiment described above, the server 4 stores various types of data in the memory 45 and displays various screens on the terminal display 24. Alternatively, for example, the server 4 may store various types of data in the memory 45 and display various screens on the server display 44. Alternatively, the mobile terminal 2a may store various types of data in the memory 25 and may display various screens on the terminal display 24. In this case, the mobile terminal 2a itself functions as an advertisement creating device.

In the embodiment described above, the created multiple POP candidate images are sequentially displayed on the preview screen 6 one by one. Alternatively, the created multiple POP candidate images may be displayed sequentially in a set or in the form of list, for example.

In the embodiment described above, commodity information is entered on the input screen 5 to create POP data introducing a target commodity. Alternatively, service information, for example, may be entered on the input screen 5 to create POP data introducing a target service.

In the embodiment described above, a POP candidate image displayed in response to a swipe operation entered as the first or second switching operation has a different display style for the first or second POP data component. Alternatively, a POP candidate image having a different display style for the first or second POP data component may be displayed in response to a tapping or pressing operation of a predetermined button.

Alternatively, a POP candidate image having a different display style for the first or second POP data component may be displayed depending on, for example, the rate of a swipe operation entered as the first or second switching operation. In detail, a POP candidate image displayed in response to a faster swipe operation may have a display style for the first or second POP data component which is more significantly different than that displayed in response to a slower swipe operation.

Alternatively, a POP candidate image displayed in response to a swipe operation entered as the first or second switching operation may have a display style for a different combination of the first or second display mode (layout, eye catch, font, background, font color, texture and illustration). In detail, a POP candidate image displayed in response to a first switching operation entered may have display styles which differ in layout and background. A POP candidate image displayed in response to a second switching operation entered may have display styles which differs in eye catch and illustration. As described above, a POP candidate image may differ between display styles for multiple POP data components, not in a display style for only any one of the POP data components.

In the embodiment described above, in response to the first or second switching operation entered, a POP candidate image displayed on the terminal display 24 before the switching operation is replaced with a POP candidate image having a different display style for the first or second POP data component. Alternatively, for example, a POP candidate image having a different display style for the first or second POP data component may be fully or partially displayed together with the POP candidate image displayed on the terminal display 24 before the switching operation. Alternatively, for example, multiple POP candidate images each having a different display style for the first or second POP data component may be fully or partially displayed together with the POP candidate image displayed on the terminal display 24 before the switching operation.

In the above embodiment, the computer readable medium for the programs according to the present invention is a hard disk, semiconductor nonvolatile memory, or the like but the present invention is not limited to these examples. Other examples of the computer readable medium include a potable recording medium such as a CD-ROM. A medium that provides the data of the programs through the communication line according to the present invention may be a carrier wave.

Some examples of the present invention have been described so far; however, the scope of the present invention is not limited to the examples described above, and includes the range of the invention described in the scope of claims and its equivalent range.

What is claimed is:

1. An advertisement creating device, comprising:
   a display including a display screen; and
   a processor that performs:
   first display controlling in which an advertisement is displayed in a first display region of the display screen as a display sample, the advertisement comprising a plurality of display components;
   second display controlling in which a setting button is displayed in a second display region of the display screen, the setting button being used by a user to select two display components out of the plurality of display components in the display sample;
   receiving in which a switching operation for replacement of the display sample displayed in the first display region is received, wherein the display sample displayed in the first display region before the switching operation is a pre-switching display sample and is a display candidate among a plurality of display candidates; and
   selecting in which a display candidate to be displayed is selected in response to the switching operation received in the receiving as a post-switching display sample out of the plurality of display candidates in accordance with a priority order of display predetermined for each display candidate,
   wherein:
   the priority order of display is determined using a two-dimensional array where the plurality of display candidates are set at respective arrangement coordinate positions, such that, the two-dimensional array, a first plurality of display candidates arranged along a first axis direction have different display styles from each other with respect to a first display mode related to one of the two display components selected by the user with the setting button, and a second plurality of display candidates arranged along a second axis direction have different display styles from each other with respect to a second display mode related to another of the two display components selected by the user with the setting button, and
   in the selecting, in response to the switching operation received in the receiving, the processor selects, as the post-switching display sample, a display candidate out of the display candidates that are adjacent to the pre-switching display sample in the first axis direction or the second axis direction in the array.

2. The advertisement creating device according to claim 1, wherein the plurality of display components are classified into different categories.

3. The advertisement creating device according to claim 1, wherein at least one of the plurality of display components is eye catch.

4. The advertisement creating device according to claim 1, wherein:
   the display is a touch panel display that detects a touch operation to the display screen, and
   the switching operation is a swipe operation in the first axis direction or the second axis direction.

5. A non-transitory computer-readable recording medium storing a program that is executable by a computer to cause the computer to perform functions comprising:
   first display controlling in which an advertisement is displayed in a first display region of a display screen as a display sample, the advertisement containing a plurality of display components;
   second display controlling in which a setting button is displayed in a second display region of the display screen, the setting button being used by a user to select two display components out of the plurality of display components in the display sample;
   receiving in which a switching operation for replacement of the display sample displayed in the first display region is received, wherein the display sample displayed in the first display region before the switching operation is a pre-switching display sample and is a display candidate among a plurality of display candidates; and
   selecting in which a display candidate to be displayed is selected in response to the switching operation received in the receiving as a post-switching display sample out of the plurality of display candidates in accordance with a priority order of display predetermined for each display candidate,
   wherein:
   the priority order of display is determined using a two-dimensional array where the plurality of display candidates are set at respective arrangement coordinate positions, such that, in the two-dimensional array, a first plurality of display candidates arranged along a first axis direction have different display styles from each other with respect to a first display mode related to one of the two display components selected by the user with the setting button, and a second plurality of display candidates arranged along a second axis direction have different display styles from each other with respect to a second display mode related to another of the two display components selected by the user with the setting button, and
   in the selecting, in response to the switching operation received in the receiving, a display candidate is selected as the post-switching display sample out of the display candidates that are adjacent to the pre-switching display sample in the first axis direction or the second axis direction in the array.

6. The non-transitory computer-readable recording medium according to claim 5, wherein the plurality of display components are classified into different categories.

7. The non-transitory computer-readable recording medium according to claim 5, wherein at least one of the plurality of display components is eye catch.

8. The non-transitory computer-readable recording medium according to claim 5, wherein:
- the display is a touch panel display that detects a touch operation to the display screen, and
- the switching operation is a swipe operation in the first axis direction or the second axis direction.

9. An advertisement creating method executed by an advertisement creating device including a display screen, the method comprising:
- first displaying in which an advertisement is displayed in a first display region of the display screen as a display sample, the advertisement containing a plurality of display components;
- second displaying in which a setting button is displayed in a second display region of the display screen, the setting button being used by a user to select two display components out of the plurality of display components in the display sample;
- receiving in which a switching operation for replacement of the display sample displayed in the first display region is received, wherein the display sample displayed in the first display region before the switching operation is a pre-switching display sample and is a display candidate among a plurality of display candidates; and
- selecting in which a display candidate to be displayed is selected in response to the switching operation received in the receiving as a post-switching display sample out of the plurality of display candidates in accordance with a priority order of display predetermined for each display candidate, wherein:
the priority order of display is determined using a two-dimensional array where the plurality of display candidates are set at respective arrangement coordinate positions, such that, in the two-dimensional array, a first plurality of display candidates arranged along a first axis direction have different display styles from each other with respect to a first display mode related to one of the two display components selected by the user with the setting button, and a second plurality of display candidates arranged along a second axis direction have different display styles from each other with respect to a second display mode related to another of the two display components selected by the user with the setting button, and
in the selecting, in response to the switching operation received in the receiving, a display candidate is selected as the post-switching display sample out of the display candidates that are adjacent to the pre-switching display sample in the first axis direction or the second axis direction in the array.

* * * * *

UNITED STATES PATENT AND TRADEMARK OFFICE
CERTIFICATE OF CORRECTION

| | | |
|---|---|---|
| PATENT NO. | : 10,846,741 B2 | Page 1 of 1 |
| APPLICATION NO. | : 15/885200 | |
| DATED | : November 24, 2020 | |
| INVENTOR(S) | : Tatsuzi Ichikawa et al. | |

It is certified that error appears in the above-identified patent and that said Letters Patent is hereby corrected as shown below:

In the Claims

Column 13, Line 48 (Claim 1, Line 30), after "that," insert --in--.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*